Aug. 17, 1965  T. J. KURTZWEIL ET AL  3,201,278
HERMETICALLY SEALED FUSED-ELECTROLYTE CELL
Filed June 20, 1962

INVENTORS
TERRENCE J. KURTZWEIL
MARVIN L. KRONENBERG
ROBERT E. HANSEN

BY
ATTORNEY

# United States Patent Office 3,201,278
Patented Aug. 17, 1965

3,201,278
HERMETICALLY SEALED FUSED-ELECTROLYTE CELL
Terrence J. Kurtzweil, Avon, and Marvin L. Kronenberg and Robert E. Hansen, Cleveland, Ohio, assignors to Union Carbide Corporation, a corporation of New York
Filed June 20, 1962, Ser. No. 203,813
7 Claims. (Cl. 136—4)

The present invention relates generally to electric cells of the fused electrolyte type and, more particularly, to a fused-electrolyte cell that is hermetically sealed.

Electric cells are electrochemical systems for converting chemical energy into electrical energy. One type of electric cell is the fused-electrolyte cell, which is inactive at room temperature and active at elevated temperatures. In general, cells of this type are constructed with a solid stable electrolyte and then operated at temperatures sufficiently high to melt the electrolyte, the maximum voltage usually being obtained at or near the melting point of the electrolyte. At room temperature, such cells produce essentially zero voltage.

The design of a fused-electrolyte cell must necessarily include a container which can withstand high operating temperatures (at least as high as the melting point of the electrolyte) and moderate internal pressures. In certain applications, such as in a moving vehicle, the container must also be hermetically sealed to prevent the molten electrolyte from escaping therefrom. However, none of the cell structures heretofore proposed has been capable of being hermetically sealed and yet withstanding the high stresses encountered at the high operating temperatures required in fused-electrolyte cells.

It is, therefore, the main object of the present invention to provide a hermetically sealed fused-electrolyte cell which is thermally stable.

It is another object of the invention to provide such a cell that is capable of withstanding the high stresses and pressures encountered at relatively high operating temperatures.

It is a further object of the invention to provide such a cell which can be hermetically sealed without melting the electrodes and electrolyte materials contained therein.

A still further object is to provide such a cell that is capable of withstanding a corrosive internal environment, even at high operating temperatures.

Other aims and advantages of the invention will be apparent from the following detailed description of preferred embodiments thereof taken in connection with the accompanying drawings, in which like numerals refer to like parts in the several views, and in which.

Figure 1:
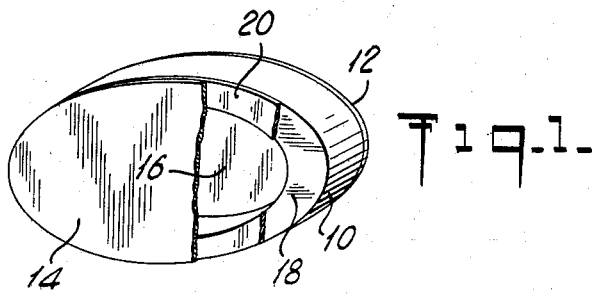
FIG. 1 is an isometric view of a preferred embodiment of the inventive structure without the electrolyte and electrode materials and with portions of various elements broken away to show the internal structure.

In accordance with the present invention, there is provided a hermetically sealed fused-electrolyte cell comprising a ceramic insulating member having at least one aperture therethrough, the aperture being at least partially filled with a fusible electrolyte; two spaced-apart dissimilar electrodes disposed in opposite ends of the aperture with the electrolyte therebetween, the electrodes being in contact with the electrolyte; and a first retaining member in contact with one of the electrodes and a second retaining member in contact with the other of the electrodes, the first and second retaining members covering the openings of the aperture through the ceramic member and being firmly bonded to the surfaces of the ceramic member around the openings of the aperture so as to hermetically seal the electrodes and electrolyte therein.

This invention provides a rugged, compact fused-electrolyte cell that is hermetically sealed to prevent the escape of molten electrolyte and electrode material therefrom and which is capable of withstanding the stresses and pressures encountered at high operating temperatures. The various materials employed in this device not only must be stable at relatively high temperatures, usually 1000° F. or higher, but also must be inert to each other at the particular operating temperature employed. In addition, the current collectors and ceramic member must be capable of being bonded together to form a hermetic seal that will also withstand high temperatures and pressures.

Preferred embodiments of the present invention will now be described in greater detail by referring to the drawings.

Referring now to FIG. 1, the cell structure illustrated therein comprises, in general, a cylindrical ceramic shell 10 and two retaining members 12 and 14 covering the ends of the cylindrical shell 10. The retaining members 12 and 14 are firmly bonded to the ends of the shell 10 so as to form a hermetically sealed cavity 16 within the shell. Although not shown in the drawing, the electrodes and electrolyte are simply inserted within the cavity 16 (while one end thereof is still open) with the anode at one end of the shell, the cathode at the other end, and the electrolyte in the middle in contact with both the cathode and anode. The ceramic shell 10 not only provides a thermally stable container for the electrical components of the shell, but also provides electrical insulation between the cathode and anode. A large variety of ceramic materials are available for use as the cylindrical shell 10, with preferred ceramic materials being beryllia and alumina. These materials are good electrical insulators and remain strong and stable even at relatively high operating temperatures (e.g., 1100 to 1300° F.). Also, beryllia and alumina are inert to most electrolytes and electrode materials at elevated temperatures.

The retaining members 12 and 14 are preferably in the form of thin discs of an electrically conductive material, such as nickel, that is thermally stable and inert to the particular cathode, anode, and electrolyte materials employed. The retaining members 12 and 14 seal the electrodes and electrolyte within the ceramic shell, protect the electrodes from oxidation and other deleterious atmospheric reactions, and also serve as means for collecting current from the cathode and anode. In cases where the retaining members are not electrically conductive, electrical leads may penetrate through the retaining members to contact the electrodes and collect the current therefrom, provided that the openings for the leads are then hermetically sealed. Where the cathode and anode are in the molten state during operation of the cell, the retaining members also serve to prevent the escape of the molten materials.

Still referring to FIG. 1, in order to bond the retaining members 12 and 14 to the ends of the ceramic shell 10 and for hermetic seals therewith, a thin coating of a material which adheres to the particular ceramic material employed, such as a metallizing mixture of molybdenum and manganese oxide containing, for example, 70 weight percent molybdenum and 30 weight percent manganese oxide in the case of a beryllia or alumina shell 10, is applied to the annular end surfaces of the shell 10. This coating need be only a few thousandths of an inch thick and may be formed by applying a liquid suspension of the metallizing agents to the end surfaces of the ceramic shell, as is well known in the ceramics art, and firing the coated shell at a suitable temperature so as to produce a firm bond between the metallizing mixture and the ceramic surface. After firing, both the coated end surfaces of the shell 10 are plated with a coating 18 of a suitable metal, such as nickel, to form a suitable base for soldering or brazing. The coating 18 may be applied by electroplating, electroless plating, or other suitable methods.

At this point, one metal-coated end of the ceramic shell 10 is bonded, suitably by brazing, to one of the retaining members 12, and at the same time a metal ring 20 is bonded to the opposite annular end surface of the ceramic shell 10. The ceramic shell 10, metal ring 20, and retaining member 12 are placed in tight engagement with each other in a vacuum furnace or hydrogen furnace and heated to a temperature suitable for brazing, thus forming a container with one open end through which the electrodes and electrolyte may be inserted into the ceramic shell 10. The metal ring 20 serves two purposes: it provides mechanical support for that side of the ceramic shell and prevents uneven thermal expansion and subsequent cracking of the ceramic body which tends to occur when only the retaining member 12 is bonded thereto. Further, the metal ring 20 facilitates the bonding of the other retaining member 14 to the assembly after the electrodes and electrolyte have been positioned therein, without melting the electrodes or electrolyte. The metal ring 20 generally conforms to the shape of the end surface of the ceramic shell but may extend slightly beyond the outer periphery of the ceramic shell so as to facilitate attachment of the remaining retaining member 14. The metal ring 20 may be nickel or any suitable metal resistant to the cell components and is preferably of the same metal as retaining member 14 or of a metal having a melting point close to that of member 14 so as to facilitate bonding these two parts. The remaining retaining member 14 can then be easily bonded to the metal ring 20, such as by shielded-arc welding with the heat required for welding being confined locally to the edges of the cell so as to prevent melting of the internal components.

The particular electrolyte and electrode materials employed in the inventive fused-electrolyte cell are not critical. Of course, the cathode and anode must be dissimilar. The cathode is preferably a thermally stable material containing an oxygenated anion or oxide, the anion or oxide serving as the depolarizer for the cell. The oxygenated anions or oxides of the elements of the first two periods of groups III A through VI A of the Periodic Table (H. Remy, Treatise on Inorganic Chemistry, Vol. 1, 1956, page 4) are preferred. Suitable anode materials are calcium, magnesium, and active metal alloys of one of these or similar metals. Suitable electrolytes are a lithium chloride-potassium chloride eutectic, a calcium chloride-sodium chloride eutectic, and a sodium chloride-potassium chloride eutectic, with the lithium chloride-potassium chloride eutectic being preferred. All the specified materials are suitable for use with each other in any combination and with a ceramic shell of beryllia, alumina, or other suitable ceramic material, such as zirconia. A cell constructed as described above with a beryllia shell, nickel retaining members, a calcium anode, a lithium chloride-potassium chloride electrolyte and a cathode depolarizer of potassium phosphate-lithium phosphate with added graphite and sodium fluoride has performed quite satisfactorily at a temperature of 1190° F with no mechanical breakage or leakage.

Figure 2:
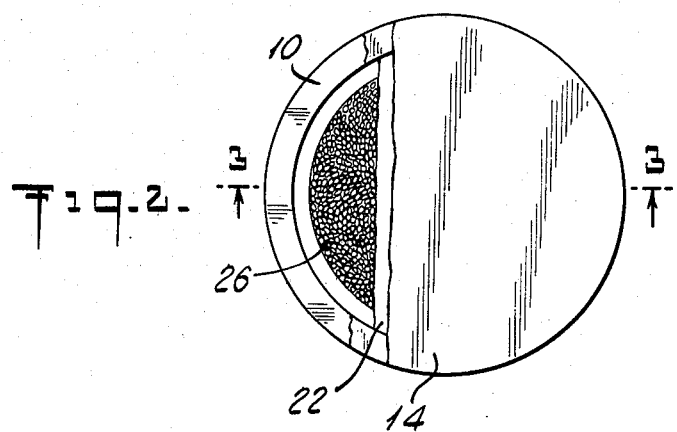
FIG. 2 is an elevation view in section of a modified embodiment of the inventive structure, including the electrolyte and electrode materials.
Figure 3:
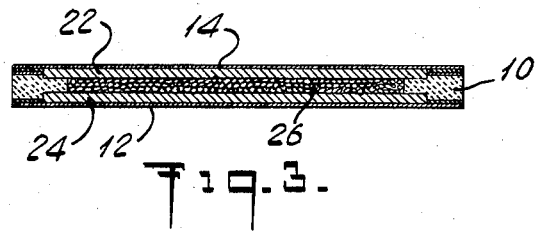
FIG. 3 is a plan view of the structure shown in FIG. 2 with portions thereof broken away to show the internal elements.

A modified embodiment of the inventive cell structure is shown in FIGS. 2 and 3. As in the device shown in FIG. 1, the cell illustrated in FIGS. 2 and 3 comprises, in general, a cylindrical ceramic shell 10 and two electrically conductive retaining members 12 and 14 firmly bonded to the ends of the shell in the manner previously described so as to form a hermetically sealed cavity. As can be seen in the elevation view in FIG. 3, the ceramic shell in this device is provided with annular grooves around the inner peripheries of the two ends thereof to retain the electrodes in a spaced-apart relationship. Thus, an anode disc 22, such as calcium, is retained in the upper annular groove, and a cathode disc 24 is retained in the lower annular groove. The annular grooves should be large enough to allow for thermal expansion of the electrodes. The space between the two electrodes is filled with a fusible electrolyte 26, such as a granular mixture of lithium chloride and potassium chloride. As described above in connection with FIG. 1, electrically conductive retaining discs 12 and 14 are hermetically sealed to the ends of the ceramic shell 10.

In order to use the aforedescribed cells for electrical power generation, the temperature of the electrolyte must be increased at least to its melting point, and a load circuit electrically connected to the two current-collecting discs 12 and 14. The temperature of the electrolyte may be increased by placing the cell in a furnace, or by means of a chemical thermite reaction, or by waste heat from nuclear or conventional power sources or by any other suitable heating means. Optimum operating temperatures for various electrolytes are well known in the art of fused-electrolyte cells.

While presently preferred embodiments of the present invention have been described herein in some detail, it will be understood that the same are susceptible of numerous modifications. For example, although one preferred process for bonding the retaining members to the ceramic member has been described in great detail, other bonding processes are equally applicable to this invention. Thus, it may be possible to bond metal retaining members directly to the ceramic shell without the use of intermediate metal coatings and rings by electron beam welding. Also, a separator of a suitable material such as magnesia or zirconia may be used in the cell, such as between the anode and the electrolyte layer, or on both sides of the electrolyte layer. The use of a separator has been found advantageous in certain cases; for example, when the anode and/or the cathode become molten during operation, small drops of electrode material may bridge through the electrolyte and short the cell unless prevented from doing so. If desired, granular magnesia or zirconia can be mixed with the electrolyte and compressed into a single layer similar to layer 26 in FIG. 3. In some cases, it may be feasible to spray a separator layer onto the anode prior to assembly. Moreover, it is possible to form multiple-cell units by stacking a plurality of the cells together.

While various specific forms of the present invention have been illustrated and described herein, it is not intended to limit the invention to any of the details herein shown.

What is claimed is:

1. A hermetically sealed fused-electrolyte cell comprising: a ceramic member having at least one aperture therethrough, said aperture being at least partially filled with a fusible electrolyte, the surfaces of said ceramic member normal to the openings of said aperture being coated with metallic material that is firmly bonded to said ceramic member; two spaced-apart dissimilar electrodes disposed in opposite ends of said aperture with said electrolyte therebetween, said electrodes being in contact with said electrolyte; and a first retaining member in contact with one of said electrodes and a second retaining member in contact with the other of said electrodes, said first and second retaining members covering the openings of said aperture through said ceramic member and being firmly bonded to said coatings of metallic material around the openings of said aperture so as to hermetically seal said electrodes and said electrolyte in said aperture.

2. The hermetically sealed fused-electrolyte cell of claim 1 wherein said first and second retaining members are electrically conductive.

3. The hermetically sealed fused-electrolyte cell of claim 1 wherein said ceramic member is a ceramic material are nickel.

4. The hermetically sealed fused-electrolyte cell of claim 1 wherein said ceramic member is a ceramic material selected from the group consisting of beryllia and alumina.

5. The hermetically sealed fused-electrolyte cell of claim 1 wherein said ceramic member having at least one aperture therein is a cylindrical ceramic shell.

6. The hermetically sealed fused-electrolyte cell of claim 1 wherein said coatings of metallic material consist of a first layer of a metallizing mixture of molybdenum and manganese oxide in molecular contact with the surfaces of said ceramic member around the openings of said aperture and a second layer of nickel in molecular contact with said first layer.

7. The hermetically sealed fused-electrolyte cell of claim 1 wherein a metal ring is disposed between the coating of metallic material and the retaining member on one end of said ceramic member, said ring being bonded to said coating of metallic material and said retaining member being bonded to said ring.

References Cited by the Examiner

UNITED STATES PATENTS

| | | |
|---|---|---|
| 856,162 | 6/07 | Kitsee. |
| 2,928,890 | 3/60 | Van Der Grinten et al. __ 136—83 |
| 3,055,960 | 9/62 | Yalom et al. |
| 3,079,454 | 2/63 | McGinnis _____ 136—153 |

JOHN H. MACK, *Primary Examiner*.